US008850238B2

United States Patent
Wang

(10) Patent No.: US 8,850,238 B2
(45) Date of Patent: *Sep. 30, 2014

(54) SERVER RACK SYSTEM WITH INTEGRATED MANAGEMENT MODULE CONNECTED TO FIRST AND SECOND NETWORK SWITCHES TO MANAGE OPERATIONS OF RACK INTERNAL DEVICE

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 278 days.

This patent is subject to a terminal disclaimer.

(21) Appl. No.: 13/372,190

(22) Filed: Feb. 13, 2012

(65) Prior Publication Data

US 2013/0138979 A1    May 30, 2013

(30) Foreign Application Priority Data

Nov. 28, 2011   (CN) .......................... 2011 1 0385474

(51) Int. Cl.
*G06F 1/00* (2006.01)
*G06F 1/26* (2006.01)
*G06F 1/32* (2006.01)

(52) U.S. Cl.
CPC ............... *G06F 1/3203* (2013.01); *G06F 1/26* (2013.01); *G06F 1/3296* (2013.01)
USPC ...................................................... 713/300

(58) Field of Classification Search
CPC ....... G06F 1/3203; G06F 1/26; G06F 1/3296; Y02B 60/1285
See application file for complete search history.

(56) References Cited

U.S. PATENT DOCUMENTS

| | | | |
|---|---|---|---|
| 7,051,215 B2 * | 5/2006 | Zimmer et al. ............... | 713/300 |
| 2005/0076255 A1 * | 4/2005 | Bresniker et al. ............. | 713/320 |
| 2007/0245165 A1 * | 10/2007 | Fung .............................. | 713/320 |
| 2008/0275975 A1 * | 11/2008 | Pandey et al. ................. | 709/223 |
| 2009/0125737 A1 * | 5/2009 | Brey et al. ..................... | 713/322 |
| 2009/0271645 A1 * | 10/2009 | Mori ............................. | 713/320 |
| 2012/0204051 A1 * | 8/2012 | Murakami et al. ............ | 713/324 |

* cited by examiner

*Primary Examiner* — Thomas Lee
*Assistant Examiner* — Lin Lin Htay
(74) *Attorney, Agent, or Firm* — CKC & Partners Co., Ltd.

(57) ABSTRACT

A server rack system includes a first network switch, a second network switch, servers, a rack internal device, and an integrated management module (IMM). Management network ports of baseboard management controllers (BMCs) of the servers are connected to the first network switch. A management network port of the rack internal device is connected to the second network switch. A first management network port and a second management network port of the IMM are respectively connected to the first network switch and the second network switch. The IMM communicates with the BMCs of the servers through the first network switch, so as to obtain operation states of the servers, or control operations of the servers. The IMM communicates with the rack internal device through the second network switch, so as to obtain an operation state of the rack internal device, or control an operation of the rack internal device.

18 Claims, 3 Drawing Sheets

SERVER RACK SYSTEM WITH INTEGRATED MANAGEMENT MODULE CONNECTED TO FIRST AND SECOND NETWORK SWITCHES TO MANAGE OPERATIONS OF RACK INTERNAL DEVICE

CROSS-REFERENCE TO RELATED APPLICATION

This application claims the priority benefit of China application serial no. 201110385474.9, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a server, in particular, to a server rack system.

2. Description of Related Art

FIG. 1 is a schematic block diagram of a conventional server rack. In a conventional rack 100, a service network switch 120 and multiple servers 110_1-110_n are disposed. The servers 110_1-110_n each have a service network port, and the service network ports are all connected to the service network switch 120. The servers 110_1-110_n are connected to an Internet 10 through the service network switch 120. In the conventional rack 100, each server manages internal power consumption and temperature thereof respectively, and the conventional management technique has a problem of poor energy-saving effectiveness. On the other hand, each server is an independent system. Each server respectively includes an AC-to-DC power supply, and multiple small fans for heat dissipation. However, large numbers of the power supplies and small fans for heat dissipation increase the manufacturing cost.

SUMMARY OF THE INVENTION

Accordingly, the present invention is directed to a server rack system, which manages servers and other rack internal devices in a rack system through a network.

An embodiment of the present invention provides a server rack system, which includes a first network switch, a second network switch, multiple servers, at least one rack internal device, and an integrated management module (IMM). The first network switch is coupled to a management network. The servers each have a baseboard management controller (BMC). The BMCs each have a management network port. The management network ports of the BMCs are connected to the first network switch. A management network port of the rack internal device is connected to the second network switch. The IMM has a first management network port and a second management network port. The first management network port of the IMM is connected to the first network switch, and the second management network port of the IMM is connected to the second network switch. The IMM communicates with the BMCs of the servers through the first network switch, so as to obtain operation states of the servers, or control operations of the servers. The IMM communicates with the rack internal device through the second network switch, so as to obtain an operation state of the rack internal device, or control an operation of the rack internal device.

Based on the above, the server rack system disclosed in the embodiment of the present invention manages operation states of the servers through the first network switch and manages operation states of other rack internal devices through the second network switch by using the IMM, so as to obtain preferred cost effectiveness and energy-saving effectiveness.

In order to make the above features and advantages of the present invention more comprehensible, embodiments are illustrated in detail below through accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
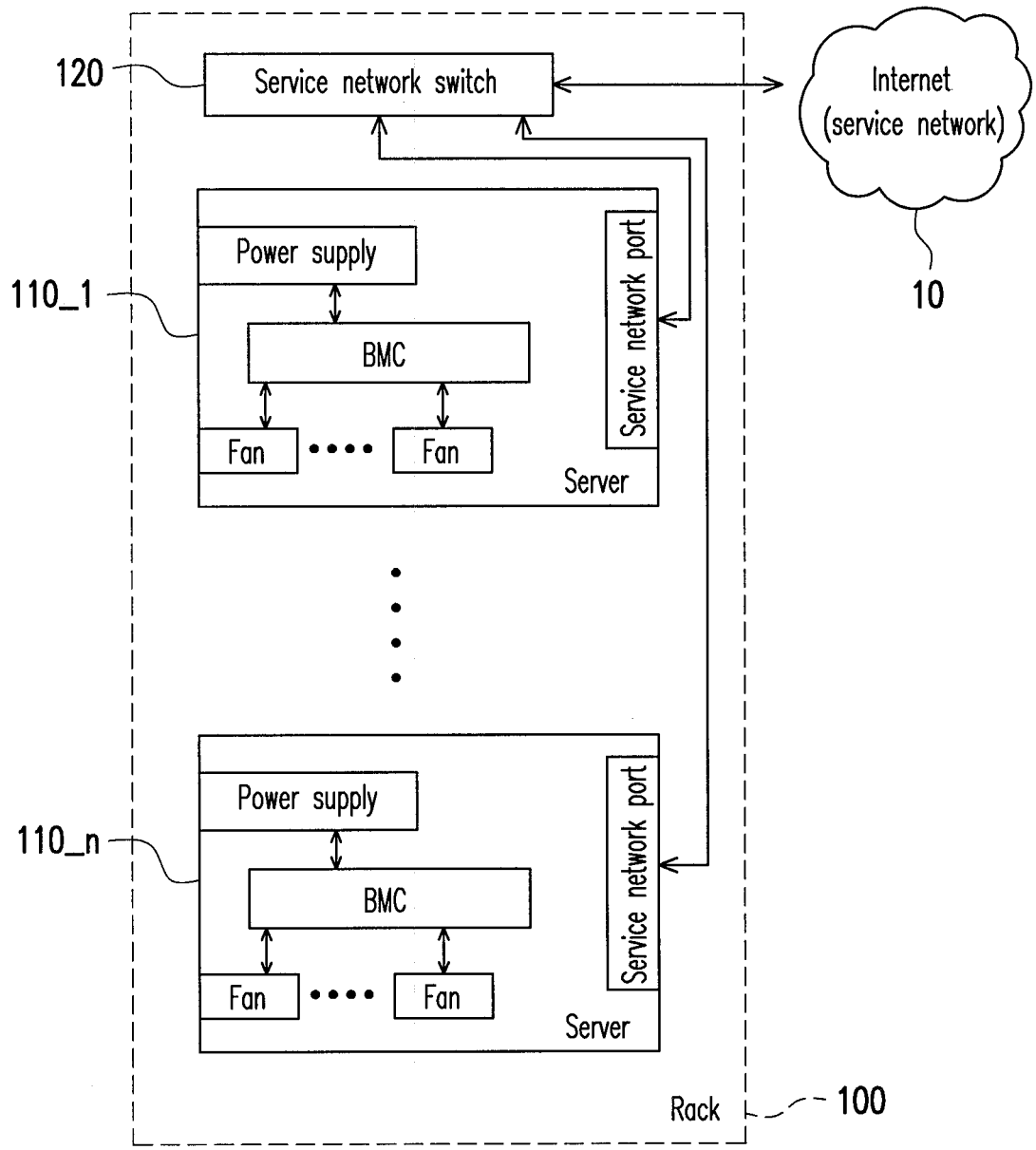
FIG. 1 is a schematic block diagram of a conventional server.

Reference will now be made in detail to the present embodiments of the invention, examples of which are illustrated in the accompanying drawings. Wherever possible, the same reference numbers are used in the drawings and the description to refer to the same or like parts.

The so-called rack internal device includes a fan unit or a power supply unit. For example, in this embodiment, fan units and a power supply unit disposed in a rack replace fans and power supplies in a conventional server, so as to facilitate centralized management on power source and fans, thereby obtaining better cost effectiveness and energy-saving effectiveness.

Figure 2:
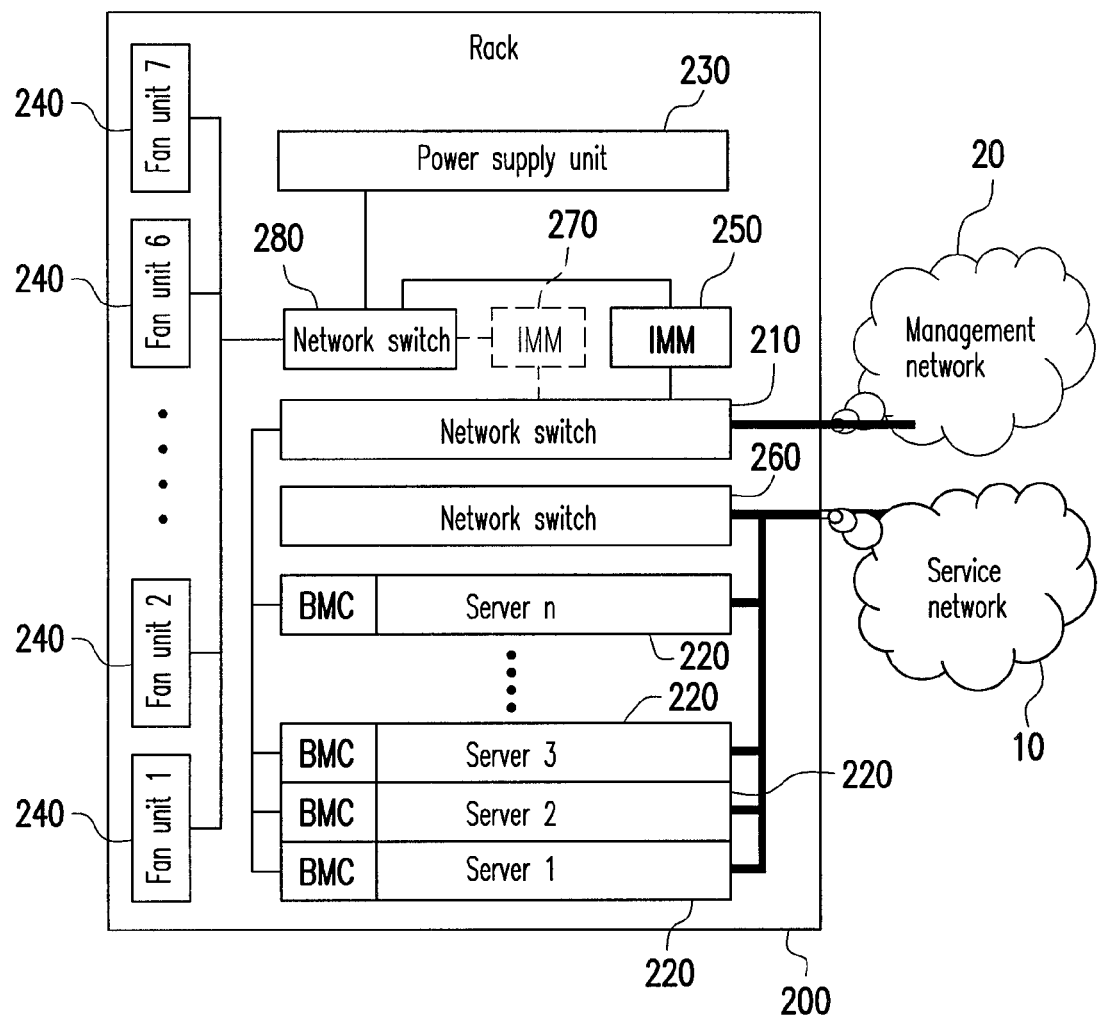
FIG. 2 is a schematic view of functional modules of a server rack system according to an embodiment of the present invention.

FIG. 2 is a schematic view of functional modules of a server rack system 200 according to an embodiment of the present invention. The server rack system 200 includes a first network switch 210, multiple servers 220, an IMM 250, a second network switch 280, a third network switch 260, and at least one rack internal device. In this embodiment, the rack internal device includes at least one power supply unit 230 and/or multiple fan units 240.

The servers 220 each have a service network port. Multiple network connection ports of the third network switch 260 (that is, a service network switch) are respectively connected to the service network ports of the servers 220. The servers 220 provide services to a service network 10 (for example, an Internet) through the third network switch 260.

The servers 220 each have a baseboard management controller (BMC), and the BMCs each have a management network port. The BMC is a well-known technique of the server, and is not repeated here. The management network ports of the BMCs are respectively connected to one of multiple network connection ports of the first network switch 210. The first network switch 210 (that is, a management network switch) is coupled to a management network 20. The management network 20 may be a local area network (LAN), such as Ethernet. The first network switch 210 may be an Ethernet switch or another LAN switch.

The IMM 250 has a first management network port and a second management network port. The first management network port of the IMM 250 is connected to the first network switch 210. The second management network port of the IMM 250 is connected to the second network switch 280. The IMM 250 communicates with the BMCs of the servers 220 through the first network switch 210, so as to obtain operation states of the server 220 (for example, operation states such as internal temperatures of the servers), and/or control operations of the server 220 (for example, control operations such as switching on and off of the servers, and updating of firmware).

The management network port of the at least one rack internal device (for example, the power supply unit 230 and/or the fan units 240) is connected to the second network switch 280. The IMM 250 communicates with the rack internal device through the second network switch 280, so as to obtain the operation state of the rack internal device, or control the operation of the rack internal device. The second network switch 280 may be an Ethernet switch or another LAN switch.

The server rack system 200 is configured with at least one power supply unit 230. The power supply unit 230 supplies power to the server rack system 200, for example, supplies power to the first network switch 210, the second network switch 280, the third network switch 260, the servers 220, the fan units 240, and the IMM 250. The power supply unit 230 has a management network port. The management network port of the power supply unit 230 is connected to the second network switch 280. The IMM 250 may communicate with the power supply unit 230 through the second network switch 280, so as to obtain an operation state of the power supply unit 230, and/or control an operation of the power supply unit 230. The power supply unit 230 provides power to the server rack system 200 according to the control of the IMM 250. For example, the IMM 250 may obtain related power consumption information of the server rack system 200 through the first network switch 210 (for example, obtains power consumption of all the servers 220). According to the power consumption information, the IMM 250 sends a control command to the power supply unit 230 through the second network switch 280, so as to control/adjust power output of the power supply unit 230.

Figure 3:
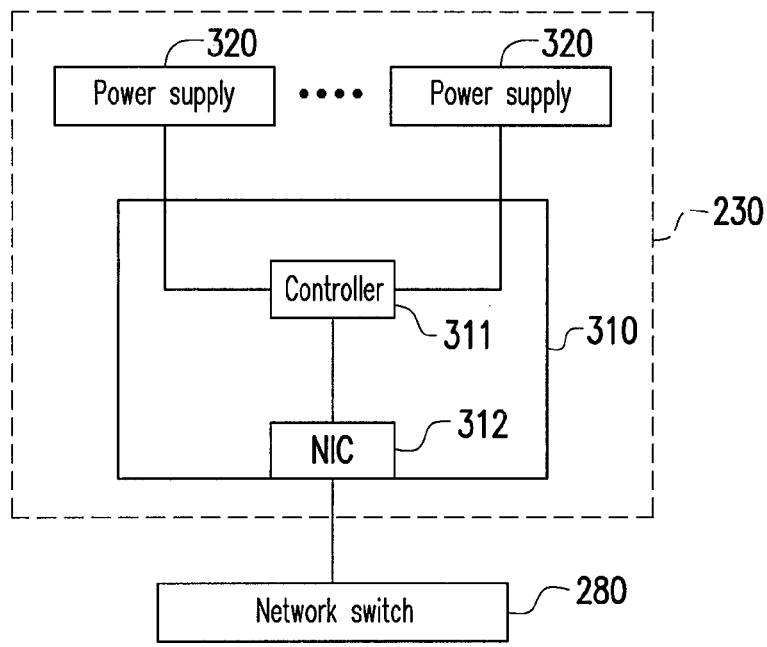
FIG. 3 is a schematic view of functional modules of a power supply unit shown in FIG. 2 according to an embodiment of the present invention.

FIG. 3 is a schematic view of functional modules of a power supply unit 230 shown in FIG. 2 according to an embodiment of the present invention. The power supply unit 230 includes a power distribution board (PDB) 310 and multiple power supplies 320. Referring to FIG. 2 and FIG. 3, a management network port of the PDB 310 is connected to the second network switch 280. The multiple power supplies 320 are connected to the PDB 310. The power supplies 320 supply power to the server rack system 200 under the control of the PDB 310. The IMM 250 sends a control command to the PDB 310 through second first network switch 280. The PDB 310 controls outputs of the power supplies 320 according to the control command. In this embodiment, the PDB 310 includes a controller 311 and a network interface card (NIC) 312. The controller 311 may receive the control command of the IMM 250 through the NIC 312 and the second network switch 280. According to the control command, the controller 311 correspondingly controls the power supplies 320 through a bus. The bus between the controller 311 and the power supply 320 may be a power management bus (PMBUS) or another bus.

Referring to FIG. 2, the server rack system 200 is configured with multiple fan units 240, for example, FIG. 2 shows seven fan units 240. The fan units 240 each have a management network port. The management network ports of the fan units 240 are connected to the second network switch 280. The IMM 250 may communicate with the fan units 240 through the second network switch 280, so as to obtain operation states of the fan units 240 (for example, detecting rotational speeds of the fans), or control operations of the fan units 240 (for example, adjusting rotational speeds of the fans). For example, the IMM 250 accesses the BMCs of the servers 220 through the second network switch 280, so as to obtain temperature values of the servers 220. According to the temperature values of the servers 220, the IMM 250 sends a control command to the fan units 240 through the second network switch 280, so as to control/adjust the rotational speeds of the fans of the fan units 240.

In some embodiments, the IMM 250 looks up a "Fan Speed Control Table" according to the temperature values of the servers 220. The fan speed control table records corresponding relationships of the temperature values and the rotational speeds of the fans. Therefore, the IMM 250 may obtain the rotational speed values of the fan units 240 from the fan speed control table. According to the rotational speed values of the fan units 240, the IMM 250 sends a control command to the fan units 240 through the second network switch 280, so as to control/adjust the rotational speeds of the fans of the fan units 240.

Figure 4:
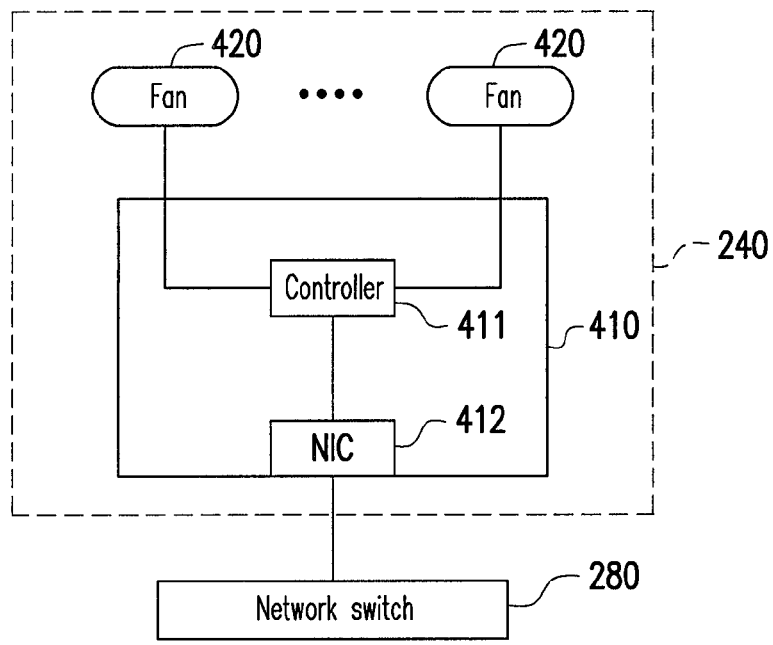
FIG. 4 is a schematic view of functional modules of a fan unit shown in FIG. 2 according to an embodiment of the present invention.

FIG. 4 is a schematic view of functional modules of a fan unit 240 shown in FIG. 2 according to an embodiment of the present invention. The fan unit 240 includes a fan control panel 410 and multiple fans 420. Referring to FIG. 2 and FIG. 4, a management network port of the fan control panel 410 is connected to the second network switch 280. The multiple fans 420 are connected to the fan control panel 410. The IMM 250 sends a control command to the fan control panel 410 through the second network switch 280. The fan control panel 410 controls rotational speeds of the fans 420 according to the control command. In this embodiment, the fan control panel 410 includes a controller 411 and an NIC 412. The controller 411 may receive the control command of the IMM 250 through the NIC 412 and the second network switch 280. According to the control command, the controller 411 correspondingly controls the fans 420 through a bus. The bus between the controller 411 and the fans 420 may be a System Management Bus (SMBus) or another bus.

Referring to FIG. 2, the first network switch 210 may be connected to a remote management station through the management network 20. The servers 220 and the IMM 250 each have a different Media Access Control (MAC) address and a different Internet Protocol (IP) address. Therefore, the remote management station may communicate with the IMM 250 and/or the servers 220 through the first network switch 210. When requiring performing management on the rack internal device (such as the power supply unit 230 and/or the fan units 240), the remote management station sends a command to the IMM 250 through the first network switch 210, so that the IMM 250 communicates with the rack internal device through the second network switch 280. The power supply unit 230 and the fan units 240 each have a different MAC address and a different IP address, so the IMM 250 may communicate with the power supply unit 230 and/or the fan units 240 through the second network switch 280. How to perform communication by using the MAC addresses or the IP addresses is a well-known technique in the field of network communications, and details about the communication are not repeated here. Therefore, the remote management station may obtain the operation states of the power supply unit 230 and/or the fan units 240 by accessing the IMM 250.

In some embodiments, the server rack system 200 adopt a full-network architecture, so the server rack system 200 may easily manage/update firmware of all devices in the rack in a centralized manner. For example, the IMM 250 stores installation firmware of the servers 220 and/or the rack internal device (such as the power supply unit 230 and/or the fan units 240). The installation firmware includes images and/or update software. When the server rack system 200 is started up, the IMM 250 may read, through the first network switch 210, a version serial number (or other version information) of current installation firmware of each of the servers 220, and compares the version serial numbers with version serial numbers of installation firmware stored in the IMM 250 to see whether they are consistent. When the version serial numbers are not consistent, the IMM 250 may update the current installation firmware by using the installation firmware stored in the IMM 250.

For example, the IMM 250 stores installation firmware of the servers 220. When the server rack system 200 is started up, the IMM 250 may read a version serial number of current installation firmware of each of the servers 220 through the first network switch 210, and compares the version serial numbers of the current installation firmware in the servers 220 and version serial numbers of installation firmware stored in the IMM 250 to see whether they are consistent. If the IMM 250 finds that the current installation firmware of a number 1 server 220 is of an old version and the installation firmware stored in the IMM 250 is of a new version, the IMM 250 may update the old current installation firmware in the number 1 server 220 by using the new installation firmware.

On the other hand, when the server rack system 200 is started up, the IMM 250 may read version serial numbers (or other version information) of current installation firmware of the rack internal device (such as the power supply unit 230 and/or the fan units 240) through the second network switch 280, and compares the version serial numbers of the current installation firmware and version serial numbers of installation firmware of the rack internal device and stored in the IMM 250 to see whether they are consistent. When the version serial numbers are not consistent, the current installation firmware of the rack internal device may be updated by using the installation firmware of the rack internal device and stored in the IMM 250.

For example, the IMM 250 stores installation firmware of the power supply unit 230. When the server rack system 200 is started up, the IMM 250 may read a version serial number of current installation firmware of the power supply unit 230 through the second network switch 280, and compares the version serial number of the current installation firmware in the power supply unit 230 and a version serial number of installation firmware stored in the IMM 250 to see whether they are consistent. If the IMM 250 finds that the current installation firmware of the power supply unit 230 is of an old version and the installation firmware stored in the IMM 250 is of a new version, the IMM 250 may update the old current installation firmware in the power supply unit 230 by using the new installation firmware.

In other embodiments, the IMM 250 may pre-store corresponding relationships of identification information and in-rack positions (for example, a rack device table) of the servers 220 with the management network ports. The IMM 250 may further pre-store corresponding relationships of identification information and in-rack positions (for example, a rack device table) of the rack internal device (such as the power supply unit 230 and/or all fan units 240) with the management network ports. The identification information may include MAC addresses and/or numbers (such as device numbers and asset numbers). For example, the identification information of the servers 200 at least includes numbers of the servers 220. The identification information of the rack internal device at least includes a type and a number of the rack internal device.

During the operation of the system, the IMM 250 may access the first network switch 210 through a Command Line Interface (CLI), so as to obtain corresponding relationships of the MAC addresses of the servers with the management network ports of the firs network switch 210 and generated by the first network switch 210, and obtain corresponding relationships of the identification information and in-rack positions of the servers with the MAC addresses according to the corresponding relationships of the identification information and the in-rack positions of the servers with the management network ports. Similarly, during the operation of the system, the IMM 250 may obtain corresponding relationships of the MAC addresses of the rack internal device (such as the power supply unit 230 and/or the fan units 240) with the management network ports of the second network switch 280 and generated by the second network switch 280, and obtain corresponding relationships of the identification information and in-rack positions of the rack internal device with the MAC addresses according to the corresponding relationships of the identification information of the rack internal device and the in-rack positions with the management network ports.

For example, the server rack system 200 configures devices such as the network switches, the servers, the power supply unit, and the fan units in the rack according to the "Rack Device Table" as shown in Table 1. For example, according to the rack device table shown in Table 1, a number 7 fan unit is placed at a 7th layer at a rear side of the rack and occupies a height of 6 layers of the servers. The number 1 server is placed at a 1st layer at a front side of the rack and occupies a height of 1 layer.

TABLE 1

Rack Device Table

| Device Type | Device Number | Height | In-Rack Position | Device Index |
|---|---|---|---|---|
| Server | 1 | 1 | Front 1 | 1 |
| ... | ... | ... | ... | ... |
| Server | 18 | 1 | Front 18 | 18 |
| Server | 19 | 1 | Front 25 | 19 |
| ... | ... | ... | ... | ... |
| Server | 36 | 1 | Front 42 | 36 |
| Fan unit | 1 | 6 | Rear 1 | 37 |
| ... | | ... | ... | ... |
| Fan unit | 7 | 6 | Rear 7 | 43 |
| IMM | 1 | 1 | Front 19 | 44 |
| IMM | 2 | 1 | Front 20 | 45 |
| Service network switch | 1 | 1 | Front 21 | 46 |
| Management network switch | 1 | 1 | Front 22 | 47 |
| Power supply unit | 1 | 2 | Front 23 | 48 |

In addition, the first network switch 210 has 40 LAN ports, and the management network ports of the first network switch 210 are connected to the servers at the corresponding positions according to a "Port Device Position Table" shown in Table 2. The second network switch 280 has 10 management network ports, and management network ports the of the second network switch 280 are connected to the rack internal device such as the power supply unit 230 and the fan units 240 at the corresponding position according to a "Port Device Position Table" shown in Table 3. For example, according to the port device position table, a first network port of the network switch 210 is specified to be connected to the number 1 server (that is, the device located at the first layer of the rack), the rest may be deduced through analog, and a 36th network port of the network switch 210 is specified to be connected to a number 36 server (that is, the device located at the 42nd layer of the rack). A 40th network port of the network switch 210 is specified to be connected to the IMM 250 (that is, the device located at the 19th layer of the rack). A 1st network port of the network switch 280 is specified to be connected to the IMM 250, and the 3rd network port of the network switch 280 is specified to be connected to the power supply unit 230 (that is, the device located at the 23rd layer of the rack).

TABLE 2

Port Device Position Table of First Network Switch 210

| Port | Device Type | Device Number |
|---|---|---|
| 1 | Server | 1 |
| ... | ... | ... |
| 36 | Server | 36 |
| 39 | | |
| 40 | IMM | 1 |

TABLE 3

Port Device Position Table of Second Network Switch 280

| Port | Device Type | Device Number |
|---|---|---|
| 1 | IMM | 1 |
| 3 | Power supply unit | 1 |
| 4 | Fan unit | 1 |
| ... | ... | ... |
| 10 | Fan unit | 7 |

Based on the "Rack Device Table" shown in Table 1 and referring to the "Port Device Position Table" shown in Table 2 and Table 3, it is known that a number 7 fan unit 240 is connected to a number 10 network port of the switch 280, and the number 1 server 220 is connected to a number 1 network port of the switch 210. By accessing the switch 280 through the CLI, a MAC address of a device connected to a number 10 network port the switch 280 may be obtained. By accessing the switch 210, a MAC address of a device connected to the number 1 network port of the switch 210 may be obtained. Therefore, the IMM 250 may obtain static connections and positions of the servers 220, the power supply unit 230 or the fan units 240 in the whole rack device 200 with reference to the "Rack Device Table" shown in Table 1 and the "Port Device Position Table" shown in Table 2 and Table 3.

During the operation of the system, through the CLI (for example, a serial port or Telnet) of the switch 210, the IMM 250 and the switch 210 may access with each other, so as to obtain a port MAC address table (that is, a PORT_MAC table) of the switch 210, and the port MAC address table has a port field and a MAC address field. In addition, the IMM 250 may also access the switch 280 through the CLI of the switch 280, so as to obtain a port MAC address table of the switch 280. For example, the IMM 250 may know, from the port MAC address table of the switch 210, the MAC address of the device connected to the number 1 network port of the switch 210, and know, from the port MAC address table of the switch 280, the MAC address of the device connected to the number 10 network port of the switch 280. The IMM 250 parses communication packets according to the MAC addresses in the port MAC address table of the switch 210, so as to obtain IP addresses of the servers. The IMM 250 may also parse communication packets according to the MAC addresses in the port MAC address table of the switch 280, so as to obtain IP addresses of the power supply unit 230 or the fan units 240.

Therefore, the IMM 250 may obtain IP addresses corresponding to devices inserted in specific network ports of the switch 210. For example, the IMM 250 may obtain the IP address of the number 7 fan unit 240 connected to the number 10 network port of the switch 280, and obtain the IP address of the number 1 server 220 connected to the number 1 network port of the switch 210. At this time, the IMM 250 may recognize that the number 7 fan unit 240 and the number 1 server 220 are in position. Therefore, the IMM 250 may perform communication with the servers 220 and the rack internal device (such as the power supply unit 230 and/or the fan units 240) in specific in-rack positions by using the corresponding IP addresses.

In another embodiment, the IMM 250 pre-stores corresponding relationships of the identification information and asset numbers of the servers 220 and the rack internal device (such as the power supply unit 230 and/or the fan units 240). Referring to the related illustration of the above embodiments, with reference to the "Rack Device Table" shown in Table 1 and the "Port Device Position Table" shown in Table 2 and Table 3, the IMM 250 may obtain the identification information (for example, device numbers) of the servers 220, the power supply unit 230 and/or the fan units 240 of the whole rack device 200, obtain corresponding relationships of the identification information and positions of corresponding devices in the rack, and even obtain corresponding relationships of the identification information and the MAC addresses. According to the corresponding relationships of the identification information and the in-rack positions and the corresponding relationships of the identification information and the MAC addresses, the IMM 250 may generate corresponding relationships of the following four times: identification information, in-rack positions, MAC addresses and assert numbers of the servers 220 and the rack internal device (such as the power supply unit 230 and/or the fan units 240), and accordingly perform assert management and assert location on the servers and the rack internal device.

The IMM 250 may further upload the corresponding relationships of the identification information, in-rack positions, MAC addresses and assert numbers of the servers 220, the power supply unit 230 and/or the fan units 240 to the remote management station through the first network switch 210. According to the above operation procedure, when replacing a device, the MAC address is also updated, so the asset number may be updated in time. With reference to the "Rack Device Table" shown in Table 1 and the "Port Device Position Table" shown in Table 2 and Table 3 again, the IMM 250 may provide a specific in-rack position of the new device to the remote management station. The IMM 250 may also upload the rack device table automatically, or provide an in-time query, for a user (or the remote management station) to perform tabulate statistics on the assert of multiple rack devices. Accordingly, the IMM 250 may perform assert management and assert location on the servers 220, the power supply unit 230 and/or the fan units 240.

It should be noted that, referring to FIG. 2, whether a standby IMM 270 is configured to the server rack system 200 may be determined according to design requirements of actual products. The standby IMM 270 has a first management network port and a second management network port. The first management network port of the standby IMM 270 is connected to the first network switch 210, and the second management network port of the standby IMM 270 is connected to the second network switch 280. The standby IMM 270 has functions the same as those of the IMM 250, and may also perform, operations the same as those of the IMM 250. When the IMM 250 fails, the standby IMM 270 may replace the IMM 250 to work.

In view of the above, the IMM 250 in the embodiment of the present invention serves as a management center of the whole rack. The IMM 250 is connected to all of the rack internal devices (such as the fan units 240 and the power supply unit 230) and the BMCs of the server 220 through a high-speed Ethernet (10/100M). The IMM 250, through the BMCs of the servers 220, obtains temperature of each server 220, calculates to obtain optimized rotational speed of a fan, and sends a command to the fan unit 240 through the management network so as to control the rotational speed of the fan. Alternatively, the IMM 250, through the BMCs of the servers 220, obtains power consumption information of each server 220, so as to obtain the total power consumption of all the servers 220. According to the total power consumption, the IMM 250 sends a command to the power supply unit 230 through the management network, so as to optimize power source output of the power supply unit 230, thereby achieving the object of energy-saving. In some embodiments, two IMMs may be deployed in one rack, so as to provide stable management to the whole rack in a 1+1 redundancy manner. All devices in the rack are connected in a full-network manner, and therefore, the server rack system 200 has the following advantages: having high speed (100M Ethernet), easy deployment (only needing to change network connections), and capable of realizing location and management of each device through a switch without any additional hardware.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system, comprising:
   a first network switch, coupled to a management network;
   a second network switch;
   multiple servers, each comprising a baseboard management controller (BMC), wherein the BMCs each comprises a management network port, and the management network ports are connected to the first network switch;
   at least one rack internal device, wherein a management network port of the rack internal device is connected to the second network switch; and
   an integrated management module (IMM), wherein the IMM has a first management network port and a second management network port; the first management network port of the IMM is connected to the first network switch; the second management network port of the IMM is connected to the second network switch; the IMM communicates with the BMCs of the servers through the first network switch, so as to obtain operation states of the servers or control operations of the servers; and the IMM communicates with the rack internal device through the second network switch, so as to obtain an operation state of the rack internal device, or control an operation of the rack internal device.

2. The server rack system according to claim 1, wherein the first network switch and the second network switch are Ethernet switches.

3. The server rack system according to claim 1, wherein the servers each comprise a service network port, and the server rack system further comprises:
   a third network switch, connected to the service network ports of the servers, wherein the servers provide services to an Internet through the third network switch.

4. The server rack system according to claim 1, wherein the first network switch is further connected to a remote management station through the management network; the remote management station communicates with the IMM and/or the servers through the first network switch; and, when requiring to performing management on the rack internal device, the remote management station sends a command to the IMM through the first network switch, so that the IMM communicates with the rack internal device through the second network switch.

5. The server rack system according to claim 1, wherein the rack internal device comprises multiple fan units; the fan units each comprise a management network port; the management network ports of the fan units are connected to the second network switch; and the IMM accesses the BMCs through the first network switch to obtain temperature values of the servers, and sends a control command to the fan units through the second network switch according to the temperature values, so as to control rotational speeds of the fan units.

6. The server rack system according to claim 5, wherein each fan unit comprises
   a fan control panel, wherein a management network port of the fan control panel is connected to the second network switch; and
   multiple fans, connected to the fan control panel, wherein the IMM sends a control command to the fan control panel through the second network switch, and the fan control panel controls rotational speeds of the fans according to the control command.

7. The server rack system according to claim 5, wherein the IMM looks up a fan speed control table according to the temperature values of the servers, so as to obtain the rotational speeds of the fan units.

8. The server rack system according to claim 1, wherein the rack internal device comprises at least one power supply unit, a management network port of the power supply unit is connected to the second network switch, and the power supply unit supplies power to the server rack system according to the control of the IMM.

9. The server rack system according to claim 8, wherein the IMM obtains power consumption of the server rack system through the first network switch, and sends a control command to the power supply unit through the second network switch according to the power consumption, so as to control power output of the power supply unit.

10. The server rack system according to claim 8, wherein, the power supply unit comprises:
    a power distribution board PDB), wherein a management network port of the PDB is connected to the second network switch; and
    multiple power supplies, connected to the PDB, wherein the power supplies supply power to the server rack system according to the control of the PDB,
    wherein the IMM sends a control command to the PDB through the second network switch, and the PDB controls outputs of the power supplies according to the control command.

11. The server rack system according to claim 1, wherein the IMM pre-stores corresponding relationships of identification information of the servers, in-rack positions and the management network ports of the first network switch; during operation of the system, the IMM obtains corresponding relationships of media access control (MAC) addresses of the servers with the management network ports of the first network switch and generated by the first network switch, and obtains corresponding relationships of the identification information, the in-rack positions of the servers and the MAC addresses according to the corresponding relationships of the identification information, the in-rack positions of the servers and the management network ports of the first network switch; and the IMM obtains Internet Protocol (IP) addresses of the servers corresponding to the MAC addresses, and communicates with the servers at specific in-rack positions by using the IP addresses.

12. The server rack system according to claim 11, wherein the identification information of the servers at least comprises numbers of the servers.

13. The server rack system according to claim 11, wherein, the IMM pre-stores corresponding relationships of the identification information and asset numbers of the servers; and the IMM generates corresponding relationships of the identification information, the in-rack positions, the MAC addresses and the asset numbers of the servers according to the corresponding relationships of the identification information, the in-rack positions and the MAC addresses of the servers, and performs asset management and asset location for the servers accordingly.

14. The server rack system according to claim 1, wherein the IMM pre-stores corresponding relationships of identification information and a in-rack position of the rack internal device with the management network port of the second network switch; during operation of the system, the IMM obtains corresponding relationships of a MAC address of the rack internal device with the management network port of the second network switch and generated by the second network switch, and obtains corresponding relationships of the identification information, the in-rack position, and the MAC address of the rack internal device according to the corresponding relationships of the identification information and the in-rack position of the rack internal device with the management network port of the second network switch; and the IMM obtains an IP address of the rack internal device corresponding to the MAC address, and communicates with the rack internal device at a specific in-rack position by using the IP address.

15. The server rack system according to claim 14, wherein the identification information of the rack internal device at least comprises a type and a number of the rack internal device.

16. The server rack system according to claim 14, wherein, the IMM pre-stores corresponding relationship of the identification information and an asset number of the rack internal device; and the IMM generates corresponding relationship of the identification information, the in-rack position, the MAC address, and the asset number of the rack internal device according to the corresponding relationship of the identification information, the in-rack position, and the MAC address of the rack internal device, and performs asset management and asset location for the rack internal device accordingly.

17. The server rack system according to claim 1, further comprising:
a standby IMM, wherein the standby IMM comprises a first management network port and a second management network port, the first management network port of the standby IMM is connected to the first network switch, the second management network port of the standby IMM is connected to the second network switch, and when the IMM fails, the standby IMM replaces the IMM to work.

18. The server rack system according to claim 1, wherein, the IMM stores installation firmware of the servers and/or the rack internal device;
when the server rack system starts up, the IMM reads a version serial number of current installation firmware of each of the servers through the first network switch, compares the version serial numbers of current installation firmware of the servers and version serial numbers of the installation firmware stored in the IMM to see whether they are consistent, and updates the current installation firmware of the servers according to the installation firmware stored in the IMM when they are not consistent; and/or
when the server rack system starts up, the IMM reads a version serial number of current installation firmware of the rack internal device through the second network switch, compares the version serial number of current installation firmware of the rack internal device and a version serial number of the installation firmware stored in the IMM to see whether they are consistent, and updates the current installation firmware of the rack internal device according to the installation firmware stored in the IMM when they are not consistent.

* * * * *